United States Patent Office 3,465,521
Patented Sept. 9, 1969

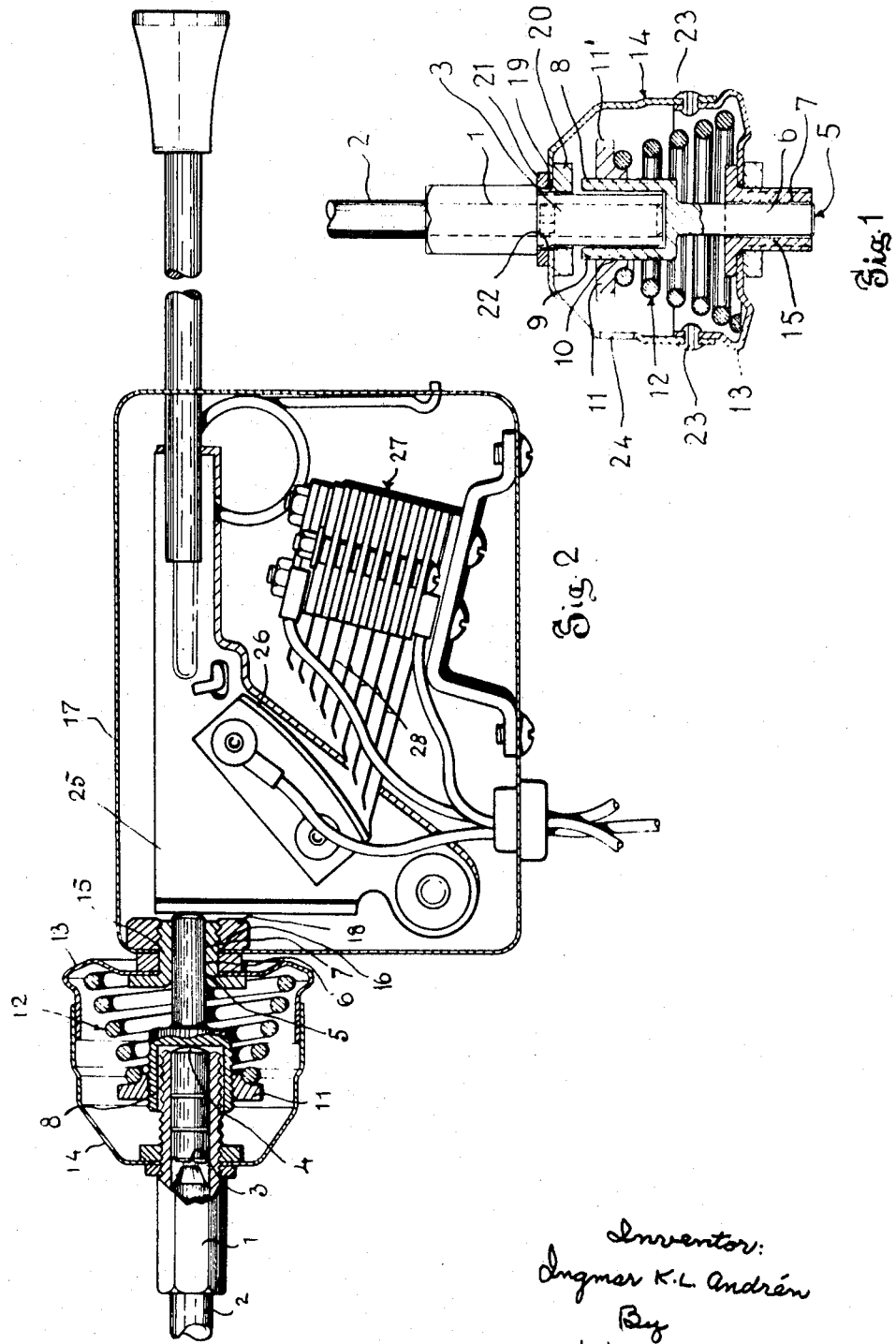

3,465,521
POWER TRANSMISSION CONTROLLING DEVICES
Ingmar K. L. Andrén, Lindesberg, Sweden, assignor to AB Linde International, Lindesberg, Sweden
Filed Nov. 14, 1967, Ser. No. 682,760
Claims priority, application Sweden, Nov. 29, 1966, 16,293/66
Int. Cl. F15b 7/08; B60t 13/66
U.S. Cl. 60—54.6  2 Claims

ABSTRACT OF THE DISCLOSURE

A device for controlling the transmission of power from a hydraulic system to a mechanical means, preferably between a hydraulic braking system and a coupling mechanism for variably regulating the supply of power to an electric braking system. The device comprises a hydraulically operable cylinder and piston assembly, the piston thereof being adapted to operate the mechanical means. A spring providing a progressively increasing resistance is interposed between an abutment associated with the piston and a second abutment which is fixedly arranged in relation to the cylinder, whereby the spring is capable, in spite of a rectilinear or uniform pressure increase in the hydraulic system, of producing a progressive shifting of the piston operating the mechanical means.

---

This invention relates to a device for controlling the transmission of power from a hydraulic system to a mechanical means, preferably between a hydraulic braking system and a coupling mechanism for variably regulating the supply of power to an electric braking system, said device comprising a cylinder connected to the hydraulic system, and a piston movable in said cylinder and adapted to operate the mechanical means.

The characteristic features of the device according to the invention reside in that the piston has associated with it an abutment which is movable together with the piston, suitably located outside the cylinder and adjustable preferably in the direction of motion of the piston, while the cylinder is immovably connected to another abutment which is spaced from the cylinder end and the first abutment, and that a spring providing a progressively increasing resistance is interposed between the two abutments to produce a progressive shifting of the piston operating the mechanical means in spite of a rectilinear or uniform pressure increase in the hydraulic system.

The above features of the invention will be more fully described in the following with reference to the accompanying drawings in which:

FIGURE 1 is a longitudinal section of the power transmission controlling device;

FIGURE 2 is a view of the device mounted in a regulator for step-wise connection of an electric braking system.

As will appear from the drawings, the cylinder 1 is connected via the line 2 to a hydraulic system which in the present instance is the braking system of a motor car. Movable in the cylinder 1 is a piston 3 (FIGURE 2), and the end 4 of the piston engages an intermediary member generally designated 5. The intermediary member is a transmission rod 6 which extends through a guide 7 and a socket 8 which is an extension of the transmission rod and surrounds the end of the cylinder 1 so that the end 4 of the piston engages the socket bottom which is formed by the end of the transmission rod. The socket 8 has an external thread 9 and a complementary thread 10 of the abutment 11 is adapted to mesh with the thread 9, making the abutment adjustable along the socket. One end of the spring 12 bears against the abutment 11 which is in the form of a ring or nut, while the other end of the spring bears against the bottom portion of an envelope formed by two bell-shaped elements 13 and 14.

The spring 12 is of a type that produces a progressively increasing resistance. As will appear particularly from FIGURE 1, the pitch of the convolutions of the spring varies, the distance between the spring convolutions being smaller at one end of the spring than at the opposite end. For an improved progressivity the spring furthermore is conical and the convolutions of less pitch are located adjacent the large diameter end.

A fastening in the form of an externally threaded head-carrying pin 15 is mounted at the bottom portion 13 of the envelope. Said pin has a longitudinal opening which constitutes the above mentioned guide for the transmission rod 6. As will appear from FIGURE 2, the pin 15 is adapted for insertion in an opening 16 in the mechanism housing 17 and to be clamped with the aid of the nut 18. The opposed bell-shaped portion 14 at its distant end has an opening 19 through which the cylinder 1 extends. The cylinder 1 is adjustably clamped by means of the two nuts 20 and 21 which engage the threaded portion 22 on the outer side of the cylinder. The two bell-shaped portions 13 and 14 forming the envelope are united by means of rivets 23 passing through the overlapping edges of said portions 13, 14.

As will appear from FIGURE 2, the transmission rod 6 is adapted to engage the rocker arm 25 of the electric coupling mechanism. A contact bridge 26 mounted on the rocker arm at the movement of the said arm gradually engages the contact tongues 28 associated with a stack of resistors 27 to provide successive disconnection of the resistors which are series-connected with an electric braking device. The electric regulating mechanism illustrated is shown merely by way of example. Being enclosed in an envelope which takes up the forces arising by the action of the spring, the control device according to the invention can be connected to a great variety of different embodiments of electric coupling mechanisms as well as to other apparatus where a power conversion of the kind mentioned in the introduction is desirable.

To permit fine adjustment of the action of the spring 12 according to the hydraulic pressure relations that occur in different braking systems, as well as the desired function, the abutment ring 11 which is movable along the socket owing to the complementary threads and has notches or teeth 11' in its periphery can be rotated from outside in relation to the intermediary member, which is nonrotatable in its guide, with the aid of a suitable tool inserted through the opening 24 in the envelope to engage said notches or teeth.

While the invention has been described above in but one embodiment with reference to the accompanying drawings, those skilled in the art will readily realize that modifications may be resorted to within the scope of the appended claims.

I claim:
1. A device for controlling the transmission of power from a hydraulic system to a mechanical means, preferably between a hydraulic braking system and a coupling mechanism for variably regulating the supply of power to an electric braking system, comprising a cylinder connected to the hydraulic system, and a spring loaded piston movable in said cylinder and adapted to operate the mechanical means, wherein there is mounted between the piston and the mechanical means an intermediary member which is a guided transmission rod movable in alignment with the piston which bears against one end of said transmission rod while the other end of said rod engages the mechanical means to be moved, and a socket-like head arranged at one end of the transmission rod, said head surrounding and being movable in relation to the end of the cylinder, said socket-like head having external threads or like means which are adapted to coact with internal threads or like means of the ring- or nut-shaped first spring abutment which is adjustable by reason of said threads along said socket-like head, the second spring abutment is the bottom portion of one of two preferably cup- or bell-shaped portions, said portions are rigidly connected together to form an envelope which can be secured to a frame for the mechanical means, and the cylinder is immovably attached to the end of the other of said bell-shaped portions, the second spring abutment being nondisplaceably arranged in relation to the cylinder by means of said two bell-shaped portions constituting said envelope, and a spring providing a progressively increasing resistance is interposed between the two abutments to produce a progressive movement of the piston in spite of a rectilinear or uniform increase of pressure in the hydraulic system.

2. A device as claimed in claim 1 in which the intermediary member is nonrotatable but longitudinally movably guided in a guide enclosing the transmission rod and formed by an opening extending through a pin which serves as a fastening for said envelope, the abutment movable along the socket-shaped head by rotation is accessible for rotation through an opening in the otherwise entirely closed envelope, and notches or teeth are provided along the periphery of said abutment to facilitate rotation of the abutment with the aid of a tool inserted through the opening of the envelope into engagement with said notches or teeth.

References Cited
UNITED STATES PATENTS

| | | | |
|---|---|---|---|
| 1,635,331 | 7/1927 | Krisch | 92—130 |
| 1,808,275 | 6/1931 | Whitesell | 92—130 XR |
| 1,895,131 | 1/1933 | Leonard | 92—133 |
| 2,050,481 | 8/1936 | Blazek et al. | |
| 3,044,267 | 7/1962 | Hicks. | |

MARTIN P. SCHWADRON, Primary Examiner

R. R. BUNEVICH, Assistant Examiner

U.S. Cl. X.R.

92—133; 188—158